UNITED STATES PATENT OFFICE.

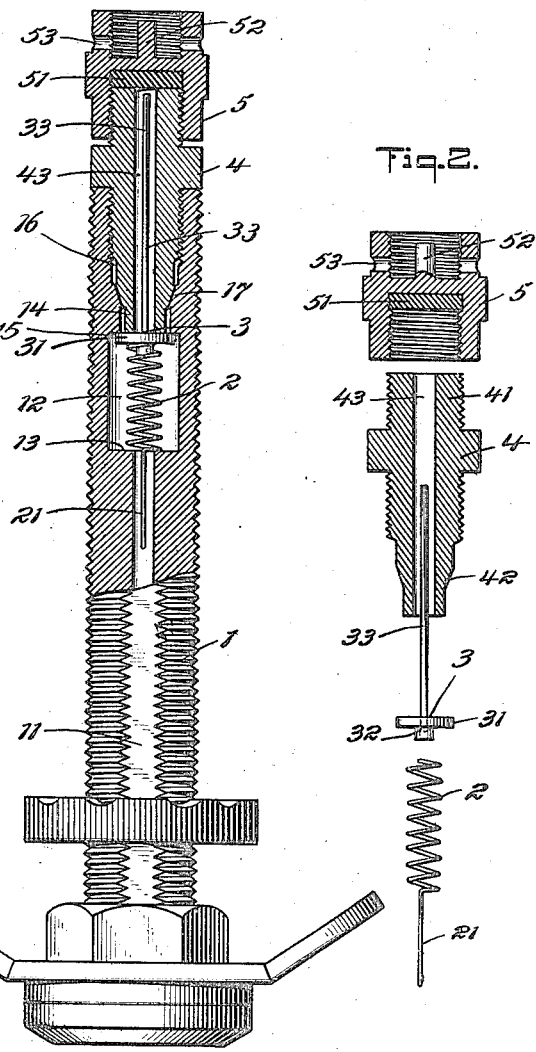
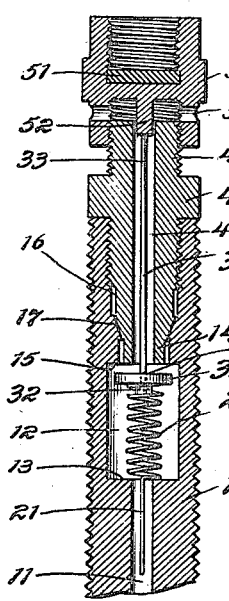
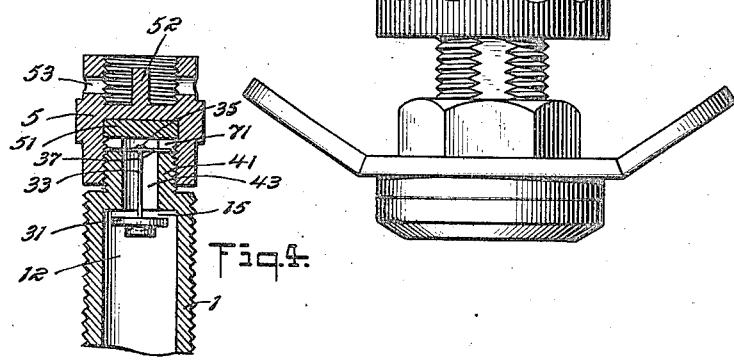

SIDNEY C. SLADDEN, OF NEW YORK, N. Y.

PNEUMATIC-TIRE-TUBE VALVE.

1,232,726. Specification of Letters Patent. Patented July 10, 1917.

Application filed March 16, 1917. Serial No. 155,139.

*To all whom it may concern:*

Be it known that I, SIDNEY C. SLADDEN, a citizen of the United States, and a resident of the city of New York, borough of Manhattan, in the county and State of New York, have invented a new and Improved Pneumatic-Tire-Tube Valve, of which the following is a full, clear, and exact description.
Among the principal objects which the present invention has in view are: to decrease the time factor incident to inflation and deflation of tires or the pneumatic tubes thereof; to cheapen the cost of construction of valves of the character mentioned; to simplify the construction to permit the rapid removal or renewal of parts of said valve; to retain the air more securely within the said tubes and for a longer period of time.
In the accompanying drawings like numerals refer to like parts:

Figure 1 is a sectional elevation of a valve of the character mentioned constructed and arranged in accordance with the present invention, showing it in a closed or service position.

Fig. 2 is a vertical sectional view of the coöperative valve element shown in alined spread relation.
Fig. 3 is a vertical sectional view of the valve construction, showing the release cap in service position, and the valve in an open position for deflating the tube.

Fig. 4 is a modified form of the invention.
As seen in the drawings, the valve stem 1 is provided with a diminished passage 11 and an enlarged passage 12. The passage 12 is formed by re-boring the stem 1 to form a ledge 13 whereon rests the edge of spring 2. The spring 2 has a tail 21 or elongated part, extending down into passage 11 to keep the said spring in an upright position in passage 12.

The function of the spring 2 is to keep the valve 3 from seating on the top of passage 11 which would stop the inflow of air when the valve is open. The spring is also used to keep the valve 3 in an easy or delicate service position when under a slight air pressure or when tube is deflated.

The valve 3 is preferably constructed of some flexible material, such as rubber. The plunger 33 is constructed of metal and has a flattened head 32 at one end. The lower part of valve 3 is flexible, but is reinforced by plunger-head 32 to keep it in its proper shape. The upper part of valve 3 has an annular flap 31 of reduced thickness, so that it may be made collapsible by a light pressure, but it will resume its normal shape upon being released. It is understood that plunger 33 is extended through or into valve 3, and the two parts are rigidly held together.

The valve 3 forms the closure member for passage 43 formed in plug 4, when the said valve is lifted and forced by the air pressure in the pneumatic tube against the plug 4. The flap 31 extends beyond the outer walls of the lower part of plug 4 and forms a closure member for any air which might otherwise escape on the outside of plug 4. It will be noticed that the width of the walls of the passage 12, is sufficient to allow the air to freely pass around the outside of the valve 3 when the valve is in open position.

The flap 31 being very pliable, is easily forced through the central air passage. When said flap reaches passage 12, it spreads to its normal shape. The said flap 31 being flat on the upper surface, will cover the entire lower surface of plug 4, including passage 43 and the surrounding lower walls of plug 4. It is understood that the lower part of plug 4 is on the same level as the upper wall 15, of passage 12, and that the flap 31 extends over and upon said wall 15.

The lower part of plug 4 is threaded to engage threads in the enlarged passage 16, in the upper part of the stem. The upper neck 41 of the plug 4 is reduced in diameter and threaded to engage threads on the cap 5. The lower part of cap 5 is hollowed and provided with a permanent soft pad 51, which pad in service presses on the top edge of the portion or neck 41 of the plug 4, to form a permanent seal for the tube with which the stem is connected.

The assembling of the parts is easily and quickly accomplished by placing spring 2 in place through passage 16; pressing valve 3 into place by means of plunger 33 through passage 16; screwing plug 4 into top of stem 1, and screwing cap 5 unto plug 4.

When it is desired to inflate or add more air to the inner tube, the air pump is attached to neck 41, and the inrush of air depresses valve 3 and the air readily passes around flap 31. When the pump is removed from neck 41 the out-rush of air, forces the valve firmly against the lower part of plug 4 and the upper part of passage 12, and prevents any air from escaping through or around plug 4.

The cap 5 has at its upper or reverse end an opening the same size and threaded similarly to the lower part, in which is located post 52. When the tube is inflated, by screwing the reverse end of cap 5 to the neck 41, the post 52 engages plunger 33, and immediately releases the valve 3, which allows the air to pass up to cap 5. This air is allowed to freely pass through the port holes 53, in cap 5, without any other aid and the tube is quickly deflated.

From the foregoing it will be seen that the present valve has no wearing parts or delicate members liable to destruction or disarrangement, or to fail in the performance of the functions for which they are designed.

In the modified form of this invention shown in Fig. 4, the valve stem and plug are constructed of one piece of metal and designated as valve-stem 1.

An enlarged passage 12 is formed by reboring the valve-stem 1, to form a ledge, against which the annular flange 31 presses, when in service position. The upper part of the neck 41 on said stem 1, is indented or slotted at opposite sides at 71, to hold a cross bar of metal 37, and in the center of said bar 37 is attached the upper part of plunger 33.

The flap 31 being very pliable, accommodates itself to passage 43 which is smaller in diameter than said flap 31 until it reaches passage 12, when it reopens itself, and resumes its normal shape. The said flap 31 being flat upon the upper surface, will cover passage 43 and part of the upper walls of passage 12 and will prevent air from escaping through said valve-stem.

The valve 3 is prevented from being upwardly forced out of this closed or service position, by plunger head 35 which hits against the rubber pad 51 in cap 5, and by the cross bar 37 coming in contact with the top of slots 71.

The valve 3 is prevented from seating upon the top of passage 11, when in open position, by the cross bar 37 resting on the lower parts of slots 71.

What I claim is:—

1. A pneumatic tube valve comprising a hollow stem having an internal chamber; a hollow-centered plug removably mounted in said stem, said plug extending into said chamber; a closure valve extending across the central passage of said plug, and said valve having an annular flexible flange extending across the joint between said plug and said stem.

2. A pneumatic tube valve comprising a hollow stem having an internal chamber; a hollow-centered plug removably mounted in said stem, said plug extending into said chamber; and a closure valve embodying a relatively solid center body, the diameter whereof approximates the diameter of the base of said plug and an annular flap extending from said body for covering the joint between said plug and said stem.

SIDNEY C. SLADDEN.

Witnesses:
MERRILL S. FLINT,
PHILIP F. DONOHUE.